United States Patent
Kim et al.

(10) Patent No.: US 12,488,236 B2
(45) Date of Patent: Dec. 2, 2025

(54) SERVER FOR REFINING MODEL IN TERMINAL AND OPERATION METHOD THEREOF

(71) Applicant: Samsung Electronics Co., Ltd., Suwon-si (KR)

(72) Inventors: Sangha Kim, Suwon-si (KR); Seokchan Ahn, Suwon-si (KR); Yoonjung Choi, Suwon-si (KR); Hakjung Kim, Suwon-si (KR); Yoonjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 952 days.

(21) Appl. No.: 17/432,631

(22) PCT Filed: Aug. 18, 2021

(86) PCT No.: PCT/KR2021/010951
§ 371 (c)(1),
(2) Date: Aug. 20, 2021

(87) PCT Pub. No.: WO2022/039494
PCT Pub. Date: Feb. 24, 2022

(65) Prior Publication Data
US 2022/0343156 A1    Oct. 27, 2022

(30) Foreign Application Priority Data
Aug. 20, 2020    (KR) .................. 10-2020-0104810

(51) Int. Cl.
*G06N 3/08*    (2023.01)
*G06F 18/21*    (2023.01)
(Continued)

(52) U.S. Cl.
CPC ............. *G06N 3/08* (2013.01); *G06F 18/217* (2023.01); *G06N 3/045* (2023.01); *G06N 3/063* (2013.01)

(58) Field of Classification Search
CPC .......... G06N 3/08; G06N 3/045; G06N 3/063; G06N 3/047; G06N 3/082; G06F 18/217
See application file for complete search history.

(56) References Cited

U.S. PATENT DOCUMENTS

| 9,093,069 | B2 | 7/2015 | Lee et al. |
| 12,072,954 | B1 * | 8/2024 | Li .............................. G06F 7/57 |

(Continued)

FOREIGN PATENT DOCUMENTS

| CN | 107508866 A | 12/2017 |
| CN | 111125760 A | 5/2020 |

(Continued)

OTHER PUBLICATIONS

Peter Kairouz et al., Advances and Open Problems in Federated Learning, arXiv:1912.04977v1, Dec. 2019 [Search date: May 11, 2021]. Source <https://arxiv.org/pdf/1912.04977v1.pdf> Sections 2.3, 4.2; and Fig. 2.

(Continued)

*Primary Examiner* — Tan H Tran
(74) *Attorney, Agent, or Firm* — Jefferson IP Law, LLP

(57) ABSTRACT

A method performed by a server is provided. The method includes, in response to input information being processed by the first model in the terminal, receiving, from the terminal, intermediate data output from a first layer included in a shared portion of the first model, obtaining the first model and a second model, which are pretrained by including the shared portion, obtaining correct answer data for the input information by inputting the intermediate data as an output of the first layer to the first layer included in the (Continued)

shared portion of the second model, in response to the intermediate data being input as the output of the first layer to the first layer included in the shared portion of the first model, refining the first model so that the correct answer data may be output from the first model, and transmitting information about the refined first model to the terminal.

15 Claims, 8 Drawing Sheets

(51) Int. Cl.
    *G06N 3/045*      (2023.01)
    *G06N 3/063*      (2023.01)

(56) References Cited

U.S. PATENT DOCUMENTS

| | | | |
|---|---|---|---|
| 2015/0324686 A1* | 11/2015 | Julian | G06N 3/08 706/25 |
| 2017/0011738 A1 | 1/2017 | Senior et al. | |
| 2019/0332944 A1 | 10/2019 | Bai et al. | |
| 2019/0340534 A1 | 11/2019 | Mcmahan et al. | |
| 2020/0082272 A1 | 3/2020 | Gu et al. | |
| 2020/0117205 A1 | 4/2020 | Ha et al. | |
| 2020/0219015 A1 | 7/2020 | Lee et al. | |
| 2023/0214666 A1* | 7/2023 | Tsuchida | G06N 3/045 706/15 |

FOREIGN PATENT DOCUMENTS

| | | |
|---|---|---|
| CN | 111275207 A | 6/2020 |
| CN | 111553484 A | 8/2020 |
| CN | 114741732 A | 7/2022 |
| KR | 10-2020-0046139 A | 5/2020 |
| KR | 10-2020-0093093 A | 8/2020 |

OTHER PUBLICATIONS

International Search Report dated Nov. 29, 2021, issued in International Application No. PCT/KR2021/010951.

* cited by examiner

SERVER FOR REFINING MODEL IN TERMINAL AND OPERATION METHOD THEREOF

TECHNICAL FIELD

The disclosure relates to a server for refining a model stored in a terminal and an operation method thereof.

BACKGROUND ART

According to on-device artificial intelligence (AI) technology, without transmitting and receiving data to and from a server, operations may be performed by an AI model stored in a terminal. The terminal using the on-device AI technology does not transmit the collected data to the outside but operates the data by itself, and thus has excellent characteristics in terms of data processing speed and a user's personal information protection.

Whenever an operation is performed by the AI model in the terminal, information related to the performed operation is transmitted to the server, and thus, information for refining the AI model in the terminal generated in the server may be provided to the terminal.

However, because the information related to the operation transmitted from the terminal to the server may include the user's personal information, there is a risk of the personal information being leaked in the process of transmission to the server. Thus, there is a need for a method of refining an AI model in a terminal, by which the risk of personal information leakage is reduced.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a server for refining a model in a terminal and an operation method thereof.

Another aspect of the disclosure is to provide a computer-readable recording medium having recorded thereon a program for executing the operation method on a computer. The disclosure is not limited to the above aspects, and there may be other aspects of the disclosure.

Technical Solution to Problem

Additional aspects will be set forth in part in the description which follows and, in part, will be apparent from the description, or may be learned by practice of the presented embodiments.

According to a first aspect of the disclosure, there is provided a method, performed by a server, of generating information for refining a first model in a terminal, the method including: when input information input to the first model is processed by the first model in the terminal, receiving, from the terminal, intermediate data output from a first layer included in a shared portion of the first model; obtaining the first model and a second model, which are models pretrained by including the shared portion therein; obtaining correct answer data for the input information by inputting the intermediate data as an output of the first layer to the first layer included in the shared portion of the second model; when the intermediate data is input as the output of the first layer to the first layer included in the shared portion of the first model, refining the first model so that the correct answer data is output from the first model; and transmitting information about the refined first model to the terminal.

According to a second aspect of the disclosure, there is provided a method, performed by a terminal, of refining a first model, the method including: when input information input to the first model is processed by the first model in the terminal, obtaining intermediate data output from a first layer included in a shared portion of the first model; transmitting the intermediate data to a server; and receiving, from the server, information for refining the first model, wherein the information for refining the first model is obtained based on correct answer data obtained by inputting the intermediate data as an output of the first layer to the first layer included in the shared portion of the second model.

Also, according to a third aspect of the disclosure, there is provided a server for generating information for refining a first model in a terminal, the server including: a communication unit configured to receive, from the terminal, when input information input to the first model is processed by the first model in the terminal, intermediate data output from a first layer included in a shared portion of the first model; a memory storing the first model and a second model, which are models pretrained by including the shared portion therein; and at least one processor configured to obtain correct answer data for the input information by inputting the intermediate data as an output of the first layer to the first layer included in the shared portion of the second model, when the intermediate data is input as the output of the first layer to the first layer included in the shared portion of the first model, refine the first model so that the correct answer data is output from the first model, and control the communication unit to transmit information about the refined first model to the terminal.

Also, according to a fourth aspect of the disclosure, there is provided a terminal for refining a first model, the terminal including: a memory storing the first model; at least one processor configured to, when input information input to the first model is processed by the first model in the terminal, obtain intermediate data output from a first layer included in a shared portion of the first model; and a communication unit configured to, when the intermediate data is transmitted to a server, receive, from the server, information for refining the first model, wherein the information for refining the first model is obtained based on correct answer data obtained by inputting the intermediate data as an output of the first layer to the first layer included in the shared portion of the second model.

Also, according to a fifth aspect of the disclosure, there is provided a computer-readable recording medium having stored therein a program for performing the method of the first aspect or the second aspect.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
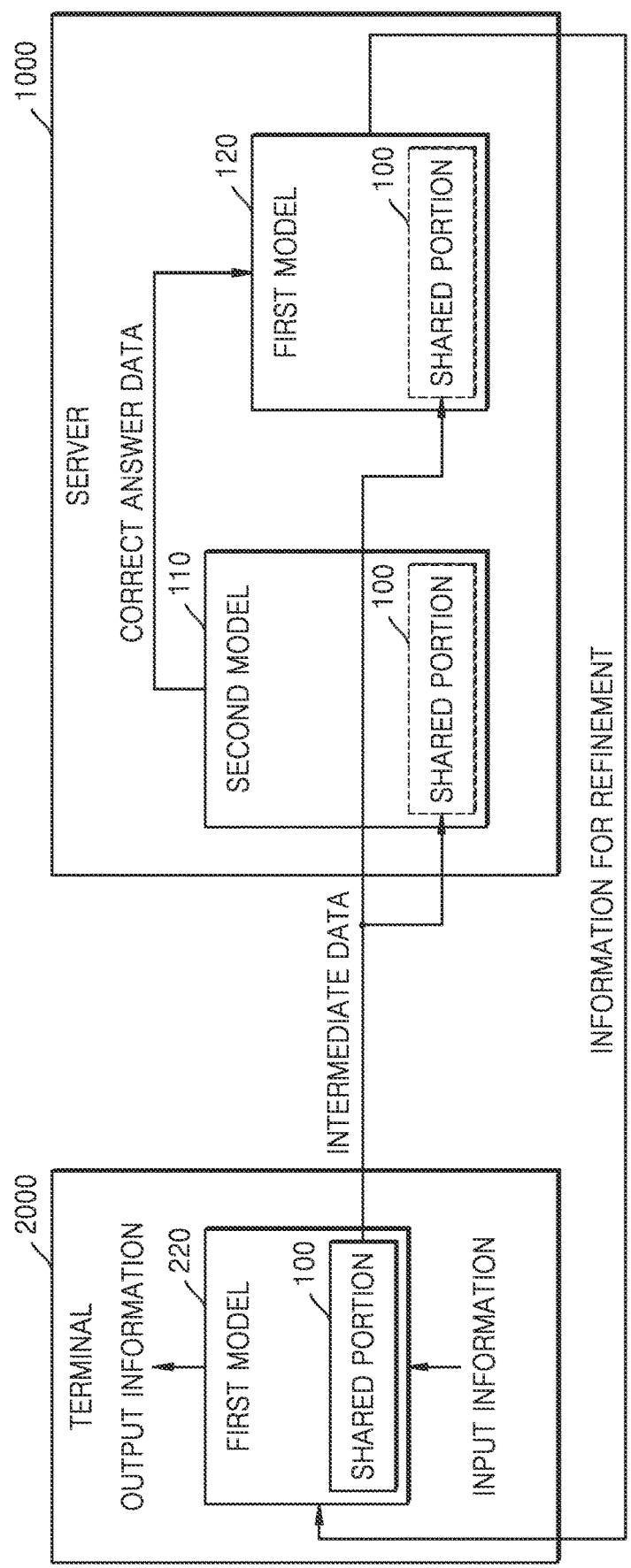
FIG. 1 is a diagram illustrating an example of refining a first model in a terminal, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings such that one of ordinary skill in the art may readily make implementations thereof. However, it should be understood that the disclosure may be embodied in different ways and is not limited to embodiments described herein. In addition, portions irrelevant to the description are omitted from the drawings for clarity, and like components are denoted by like reference numerals throughout the specification.

Throughout the specification, when an element is referred to as being "connected to" another element, the element may be "directly connected to" the other element, or the element may also be "electrically connected to" the other element with an intervening element therebetween. In addition, when an element is referred to as "including" or "comprising" another element, unless otherwise stated, the element may further include or comprise yet another element rather than preclude the yet other element.

A function related to artificial intelligence (AI) according to the disclosure is performed by a processor and a memory. The processor may be configured as one or more processors. In this case, the one or more processors may be a general-purpose processor such as a central processing unit (CPU), an application processor (AP), or a digital signal processor (DSP), a graphics processor such as a graphics processing unit (GPU) or a vision processing unit (VPU), or an AI processor such as a neural processing unit (NPU). The one or more processors control input data to be processed according to pre-defined operation rules or an AI model stored in the memory. Alternatively, when the one or more processors are AI processors, the AI processors may be designed in a hardware structure specialized for processing a specific AI model.

The pre-defined operation rules or the AI model may be made through training. Here, the expression "made through training" means that an existing AI model is trained based on a learning algorithm by using a large number of pieces of training data and thus made into a pre-defined operation rule or an AI model, which is set to fulfill an intended feature (or purpose). Such training may be performed by a device itself in which AI according to the disclosure is performed, or may be performed via a separate server/system. Examples of the learning algorithm include, but are not limited to, supervised learning, unsupervised learning, semi-supervised learning), or reinforcement learning.

An AI model may include a plurality of neural network layers. Each of the neural network layers includes a plurality of weight values and performs a neural network operation via an operation between an operation result of a previous layer and the plurality of weight values. The weight values of the neural network layers may be optimized via a result of training the AI model. For example, the weight values may be refined to reduce or minimize a loss value or a cost value obtained by the AI model during a training process. An artificial neural network may include, but is not limited to, a deep neural network (DNN), for example, a convolutional neural network (CNN), a recurrent neural network (RNN), a restricted Boltzmann machine (RBM), a deep belief network (DBN), a bidirectional recurrent deep neural network (BRDNN), or a deep Q-network.

Hereinafter, the disclosure will be described in detail with reference to the accompanying drawings.

FIG. 1 is a diagram illustrating an example for refining a first model in a terminal, according to an embodiment of the disclosure.

Referring to FIG. 1, a terminal 2000 according to an embodiment of the disclosure may perform various operations by using a first model 220. For example, when input information according to a user input is input to the first model 220, output information may be output from the first model 220, and an operation corresponding to the output information may be performed.

The input information according to an embodiment of the disclosure may include information input to the first model 220 to perform an operation. Also, the output information is a result of processing the first model 220, and the operation may be performed based on the output information.

The first model 220 according to an embodiment of the disclosure may be one of at least one AI model for performing various operations in the terminal 2000. For example, the first model 220 may be an AI model for various operations that may be performed by the terminal 2000, such as a voice recognition model, a natural language processing model, an image recognition model, or the like. The disclosure is not limited thereto, and the first model 220 may be one of various types of AI models.

The terminal 2000 according to an embodiment of the disclosure may be implemented in various forms. For example, the terminal 2000 used herein may be, but is not limited to, a smart TV, a set-top box, a mobile phone, a tablet personal computer (PC), a digital camera, a laptop computer, a desktop computer, an e-book terminal, a digital broadcasting terminal, a personal digital assistant (PDA), a portable multimedia player (PMP), a navigation system, an MP3 player, a wearable device, or the like.

According to an embodiment of the disclosure, when an operation of the terminal 2000 is performed by an AI model present in an external server 1000, the terminal 2000 may transmit input information of the AI model to the server 1000 and receive output information of the AI model to perform an operation based on the output information. However, according to an embodiment of the disclosure, according to on-device AI technology, the first model 220 for performing the operation is mounted in the terminal 2000, and thus, the input information of the first model 220 may not be transmitted to the server 1000 and may be processed in the terminal 2000.

Thus, according to an embodiment of the disclosure, the input information that may include sensitive information of a user may not be leaked to the outside during a transmission process. Also, according to an embodiment of the disclosure, a process of transmitting the input information to the server 1000 or receiving the output information from the server 1000 is not performed, and thus, an operation may be performed with a smaller operation volume than in a case where the input information is processed by the server 1000.

However, the first model 220 mounted in the terminal 2000 according to an embodiment of the disclosure may be a relatively small-sized AI model according to a relatively lower level of performance (e.g., data storage capacity, operation speed) of the terminal 2000 than that of the server 1000. For example, the first model 220 may be an AI model including a relatively small number of nodes and neural network layers. Thus, according to an embodiment of the disclosure, the first model 220 has a relatively small size, and thus, a probability of outputting output information for performing an operation suitable for a user may be relatively low.

According to an embodiment of the disclosure, in order to supplement shortcomings of the first model 220, the server 1000 may provide the terminal 2000 with information for refining the first model 220, by using a second model 110 having better performance than that of the first model 220. According to an embodiment of the disclosure, based on the information provided from the server 1000, the first model 220 in the terminal 2000 is continuously refined, and thus, as a case of using the second model 110 having better performance, suitable output information may be output even through the first model 220 having a small size.

The second model 110 according to an embodiment of the disclosure has a relatively larger size than that of the first model 220, and thus, a probability of outputting output information suitable for a user may be relatively higher. The second model 110 according to an embodiment of the disclosure may be processed by the server 1000 having relatively high performance, and thus may be an AI model including a larger number of nodes and neural network layers than the first model 220.

The server 1000 according to an embodiment of the disclosure may first refine, as an AI model identical to the first model 220 in the terminal 2000, the first model 120 mounted in the server 1000, by using the second model 110. According to an embodiment of the disclosure, the first model 120 of the server 1000 may be refined so that, with respect to identical input information, output information which is identical to the output information output from the second model 110 may be output from the first model 120. Also, the server 1000 may obtain, based on the refined first model 120, information for refining the first model 220 in the terminal 2000 and transmit the information to the terminal 2000.

The server 1000 according to an embodiment of the disclosure may obtain, as correct answer data, a value output when the input information input to the first model 220 in the terminal 2000 is input to the second model 110. Also, the server 1000 according to an embodiment of the disclosure may refine the first model 120 so that the correct answer data may be output from the first model 120 when the input information is input to the first model 120 of the server 1000.

The server 1000 according to an embodiment of the disclosure receives, from the terminal 2000, input-related information of the first model 220, which is used to perform an operation in the terminal 2000, and thus may refine the first model 120 of the server 1000. However, according to an embodiment of the disclosure, because the input information of the first model 220 may include personal information of a user, when the input information is transmitted to the server 1000, there is a risk of leakage during a transmission process.

Thus, according to an embodiment of the disclosure, other information for refining the first models 120 and 220 instead of the input information of the first model 220 is transmitted from the terminal 2000 to the server 1000, so that the first models 120 and 220 may be refined. According to an embodiment of the disclosure, the server 1000 receives, from the terminal 2000, intermediate data generated in a shared portion 100 of the first model 220 instead of the input information of the first model 220, and may refine the first model 120 of the server 1000.

The shared portion 100 according to an embodiment of the disclosure is a portion equally included in the first models 120 and 220 and the second model 110, and may include at least one neural network layer.

The AI model according to an embodiment of the disclosure may include at least one neural network layer including at least one node. Each neural network layer according to an embodiment of the disclosure includes at least one node, and values input to the AI model may be processed in each node included in the AI model and then output. For example, a value (x) input to each node is processed according to an equation, i.e., $y=ax+b$, based on a weight value (a) and a bias value (b), which are preset for each node, and thus, an output value (y) may be output from each node. The disclosure is not limited thereto, and an input value may be processed and output according to various equations, weight values, and bias values, which are set for each node.

The AI model according to an embodiment of the disclosure may include an input layer, an output layer, and at least one hidden layer. The input layer according to an embodiment of the disclosure may be a layer for directly processing information input to the AI model. Also, a hidden layer may be a layer for processing information between the input layer and the output layer. Also, the output layer may be a layer for directly outputting output information of the AI model by finally processing the information processed in the input layer and the hidden layer.

The shared portion 100 according to an embodiment of the disclosure may be set as at least one neural network layer including an input layer among the at least one neural network layer constituting the first models 120 and 220. Also, the second model 110 according to an embodiment of the disclosure may be generated to include the shared portion 100 identical to the shared portion 100 of the first models 120 and 220.

For example, when the first models 120 and 220 include an input layer, 100 hidden layers, and an output layer, the shared portion 100 may be set as the input layer and 9 hidden layers. The disclosure is not limited thereto, and the shared portion 100 may be set as various layers among layers constituting the first models 120 and 220.

According to an embodiment of the disclosure, instead of input information which may include personal information of a user, values output from a layer among a plurality of layers included in the shared portion 100 are intermediate data and may be transmitted to the server 1000. For example, according to y=ax+b, output values (y) generated in each node included in the layer may be transmitted as the intermediate data.

When receiving the intermediate data from the terminal 2000, the server 1000 according to an embodiment of the disclosure may identify a layer from which y values of the intermediate data are output. Also, based on the identified layer, the server 1000 may obtain correct answer data for input information corresponding to the intermediate data. For example, the server 1000 may obtain the correct answer data by inputting the intermediate data as an output of the identified layer.

The intermediate data according to an embodiment of the disclosure may further include, in addition to the y values, information for identifying the layer of the shared portion 100, the layer from which the y values are output. For example, the intermediate data may include values of (4, [0.3, 0.23, 0.9, . . . ]). In this case, 4 is a value for identifying a layer of the shared portion 100, and values in the square brackets may be y values output from a fourth layer.

According to an embodiment of the disclosure, when the y values of the intermediate data are output values for a third layer among layers of the shared portion 100, in the shared portion 100 of the second model 110, the intermediate data is input to the fourth layer in which the output values of the third layer are processed, and thus, correct answer data may be output from the second model 110. Also, in the first model 120 of the server 1000, when the intermediate data is input to the fourth layer of the shared portion 100, the first model 120 may be refined so that the correct answer data may be output.

According to an embodiment of the disclosure, each of the shared portions 100 respectively included in the models 110, 120, and 220 includes identical layers and nodes. Thus, each layer included in the shared portion 100 may output equal output values (y) between the models 110, 120, and 220 with respect to identical input information. For example, a first layer of the shared portion 100 equally included in each of the models 110, 120, and 220 may output equal output values with respect to identical input information. Thus, the intermediate data is transmitted to the server 1000 instead of the input information, and thus, correct answer data corresponding to the input information may be output from the second model 110.

The intermediate data according to an embodiment of the disclosure may include output values for a layer randomly selected from among layers of the shared portion 100. Thus, even when input information input to the first model 220 is the same, intermediate data including different values may be transmitted to the server 1000. For example, according to a first operation performed using the first model 220 in the terminal 2000, output values for the first layer among layers of the shared portion 100 may be transmitted as intermediate data, but afterwards, according to a second operation, output values for a fifth layer of the shared portion 100 may be transmitted as intermediate data.

Thus, according to an embodiment of the disclosure, in order to perform the first operation and the second operation, even when input information input to the first model 220 is identical to each other, output values for different layers may be transmitted as intermediate data, and thus, the intermediate data transmitted for each operation may include different values. Thus, according to an embodiment of the disclosure, because it is difficult to restore the input information input to the first model 220 even when the intermediate data is leaked to outside during a transmission process, a security level may be further increased.

The server 1000 according to an embodiment of the disclosure may generate information for refining the first model 220 in the terminal 2000, based on information related to the refined first model 120. According to an embodiment of the disclosure, the information for refining the first model 220 in the terminal 2000 may include information required to change the first model 220 in the terminal 2000 so that the first model 220 is identical to the refined first model 120. For example, the information for refining the first model 220 in the terminal 2000 may include a difference value between the first model 120 before refinement and the first model 120 after the refinement. Also, when the first model 120 is refined, the information for refining the first model 220 in the terminal 2000 may include information about data modified in the first model 120. The disclosure is not limited thereto, and the information for refining the first model 220 in the terminal 2000 may include various types of information.

The intermediate data according to an embodiment of the disclosure may be obtained whenever the first model 220 is used to perform an operation in the terminal 2000, and transmitted to the server 1000. According to an embodiment of the disclosure, whenever input information is processed by the first model 220 in response to a user input and output information is output from the first model 220, intermediate data including a value output from a layer randomly selected from among layers of the shared portion 100 may be generated. Thus, whenever intermediate data is generated, the terminal 2000 may transmit the intermediate data to the server 1000 and refine the first model 220.

The first model 120 of the server 1000 according to an embodiment of the disclosure may also be refined based on, without limiting to the intermediate data received from the terminal 2000, intermediate data received from other terminals of other users (e.g., the users with similar motion patterns or similar preference) similar to a user of the terminal 2000. The disclosure is not limited thereto, and the first model 120 of the server 1000 may be refined based on intermediate data received from various types of terminals performed in an environment similar to that of the terminal 2000.

Thus, the first model 220 in the terminal 2000 may be continuously refined based on information about the first model 120 refined by intermediate data received from other terminals even when the first model 220 is not used. Also, although the first model 220 in the terminal 2000 is intermittently used and thus intermediate data is generated less, the first model 220 may be continuously refined based on the intermediate data received from other terminals.

Figure 2:
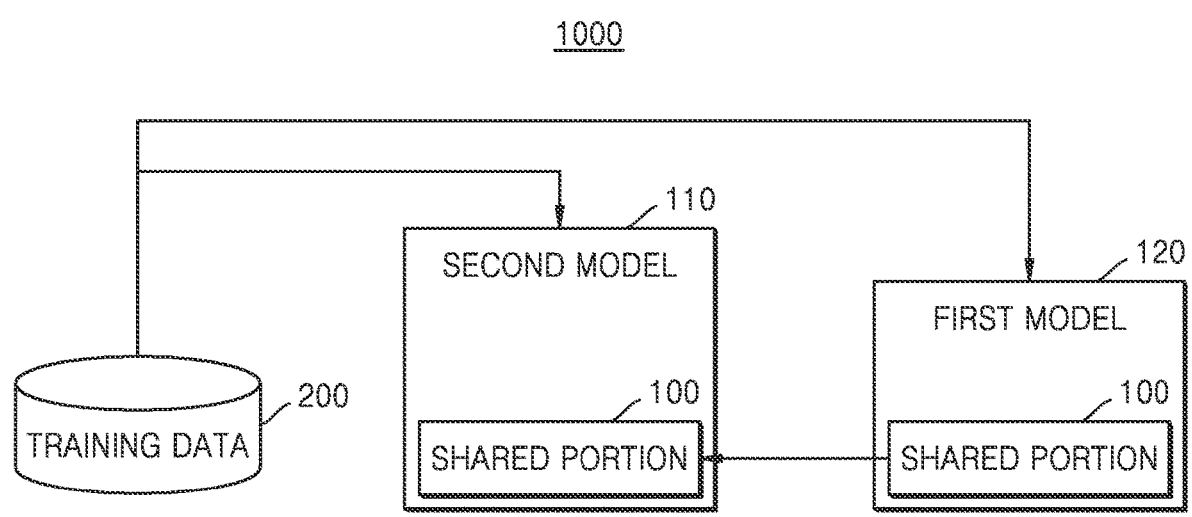
FIG. 2 is a diagram illustrating an example of generating a first model and a second model, according to an embodiment of the disclosure.

FIG. 2 is a diagram illustrating an example of generating a first model and a second model, according to an embodiment of the disclosure.

Referring to FIG. 2, a server 1000 according to an embodiment of the disclosure may first generate a first model 120, based on training data 200 for training the first model 120 and a second model 110.

The training data 200 according to an embodiment of the disclosure may include information about a pair of input information and output information for training the first model 120. The disclosure is not limited thereto, and the training data 200 may include various types of data for training the first model 120 and the second model 110.

According to an embodiment of the disclosure, after the first model 120 is generated based on the training data 200, the server 1000 may set the shared portion 100 in the first model 120. Also, the second model 110 including the shared portion 100 set in the first model 120 as it is may be trained based on the training data 200. The second model 110 according to an embodiment of the disclosure may be generated based on the training data 200 while including the shared portion 100 as it is without any modification. The second model 110 according to an embodiment of the disclosure includes more nodes or layers than the first model 120, and thus has a greater operation volume than that of the first model 120, but may output a value with high accuracy.

The shared portion 100 according to an embodiment of the disclosure may be set to include an input layer among layers constituting the first model 120. The disclosure is not limited thereto, and the shared portion 100 may be set as variously determined layers including the input layer among the layers constituting the first model 120.

When the shared portion 100 according to an embodiment of the disclosure increases, an area of the second model 110 generated and modified based on the training data 200 decreases, and thus, performance of the second model 110 may be lowered. In contrast, when the shared portion 100 increases, a range of a layer that may be randomly selected increases when intermediate data is transmitted to refine the first model 220 of FIG. 1, and thus, a security level may be further improved.

Thus, according to an embodiment of the disclosure, a suitable size of the shared portion 100 may be set based on at least one of the performances of the second model 110 trained including the shared portion 100 or the security level when the intermediate data is transmitted.

For example, when it is determined that performance of the second model 110 is significantly lowered compared to a security level due to a large size of the shared portion 100 included in the second model 110, the shared portion 100 may be reset to have a smaller size than before in the first model 120. Also, the second model 110 may be retrained and generated based on the reset shared portion 100.

In contrast, when it is determined that a security level is low due to a small size of the shared portion 100 included in the second model 110, the shared portion 100 may be reset to have a larger size than before in the first model 120, and the second model 110 may be retrained based on the reset shared portion 100.

The first model 120 generated according to an embodiment of the disclosure may be transmitted to the terminal 2000. Also, the server 1000 may generate information for refining the first model 220 transmitted to the terminal 2000 by using the first model 120 and the second model 110, and may transmit the information to the terminal 2000.

Figure 3:
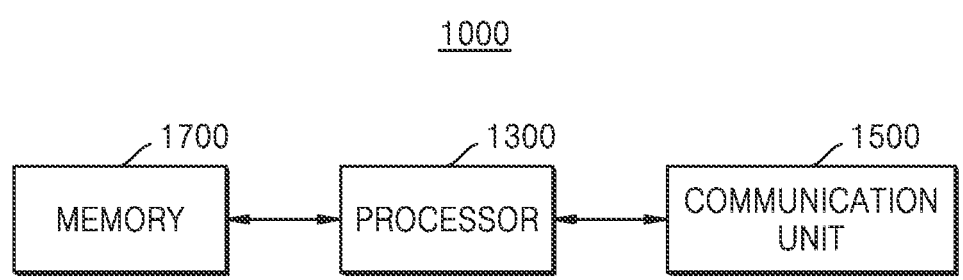
FIG. 3 is a block diagram for explaining an internal configuration of a server, according to an embodiment of the disclosure.

FIG. 3 is a block diagram for explaining an internal configuration of a server, according to an embodiment of the disclosure.

Referring to FIG. 3, a server 1000 may include a processor 1300, a communication unit 1500, and a memory 1700. However, not all the components illustrated in FIG. 3 are not necessary components of the server 1000. The server 1000 may be implemented by more components or less components than the components illustrated in FIG. 3.

The processor 1300 generally controls overall operations of the server 1000. For example, the processor 1300 may take overall control of the memory 1700, the communication unit 1500, and the like by executing programs stored in the memory 1700.

The server 1000 may include at least one processor 1300. For example, the server 1000 may include various types of processors such as a CPU, a GPU, and an NPU.

The processor 1300 may be configured to process commands of a computer program by performing basic arithmetic, logic, and input/output operations. The commands may be provided from the memory 1700 to the processor 1300 or may be received via the communication unit 1500 and provided to the processor 1300. For example, the processor 1300 may be configured to execute the commands according to program codes stored in a recording device such as memory.

The processor 1300 according to an embodiment of the disclosure may control the communication unit 1500 to receive, from the terminal 2000, when input information is processed by a first model in the terminal 2000, intermediate data output from a first layer included in a shared portion. According to an embodiment of the disclosure, whenever an operation of using the first model is performed in the terminal 2000, the generated intermediate data may be transmitted to the server 1000. The first layer according to an embodiment of the disclosure is randomly determined from among a plurality of layers included in the shared portion by the terminal 2000, and thus, the intermediate data may be transmitted to the server 1000.

Also, the processor 1300 may obtain the first model and a second model, which are models pretrained by including the shared portion therein, and may obtain correct answer data for the input information of the first model by inputting, as an output of the first layer, the intermediate data received from the terminal 2000 in the first layer included in the shared portion of the second model.

Each of the shared portions respectively included in the first and second models according to an embodiment of the disclosure may include identical nodes and layers. Thus, according to an embodiment of the disclosure, a value output from the shared portion by inputting the input information to the shared portion of the second model may be equal to a value output from the shared portion by inputting the intermediate data to the first layer of the shared portion of the second model. Thus, the intermediate data is transmitted to the server 1000 instead of the input information being transmitted to the server 1000, and thus, correct answer data for refinement of the first model may be obtained from the second model.

Also, when the intermediate data is input to a second layer included in the shared portion of the first model, the processor 1300 may refine the first model so that correct answer data may be output from the first model. The processor 1300 according to an embodiment of the disclosure may generate information for refining the first model in the terminal 2000, based on the refined first model, and may control the communication unit 1500 to transmit the information to the terminal 2000.

Also, the processor 1300 according to an embodiment of the disclosure may set the shared portion in the first model trained based on training data, and may generate the second model equally including the set shared portion based on the training data. The shared portion according to an embodiment of the disclosure may be determined to have a suitable size, based on performance of the second model and a security level that may be determined according to a range of a layer that may be randomly selected from the shared portion. When it is determined that the shared portion according to an embodiment of the disclosure is not suitable based on the performance of the second model and the security level, the shared portion may be reset in the first model, and then, based on the reset shared portion, the second model may be regenerated based on the training data.

The communication unit 1500 may include one or more components allowing the server 1000 to communicate with the terminal 2000 or an external device (not shown).

The memory 1700 may store programs for processing and control performed by the processor 1300 and may also store data that is received from or transmitted to the terminal 2000.

The memory 1700 according to an embodiment of the disclosure may store the first model and the second model. The first model stored in the server 1000 may be identical to the first model stored in the terminal 2000. Also, the second model includes more nodes and layers than the first model, and thus may be a model with higher accuracy.

The memory 1700 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

Figure 4:
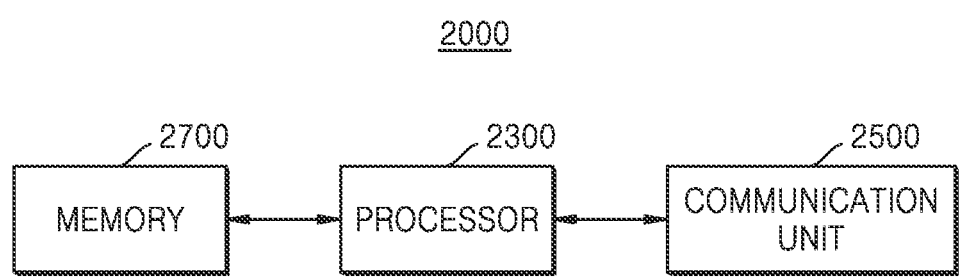
FIG. 4 is a block diagram for explaining an internal configuration of a terminal, according to an embodiment of the disclosure.

FIG. 4 is a block diagram for explaining an internal configuration of a terminal, according to an embodiment of the disclosure.

Figure 5:
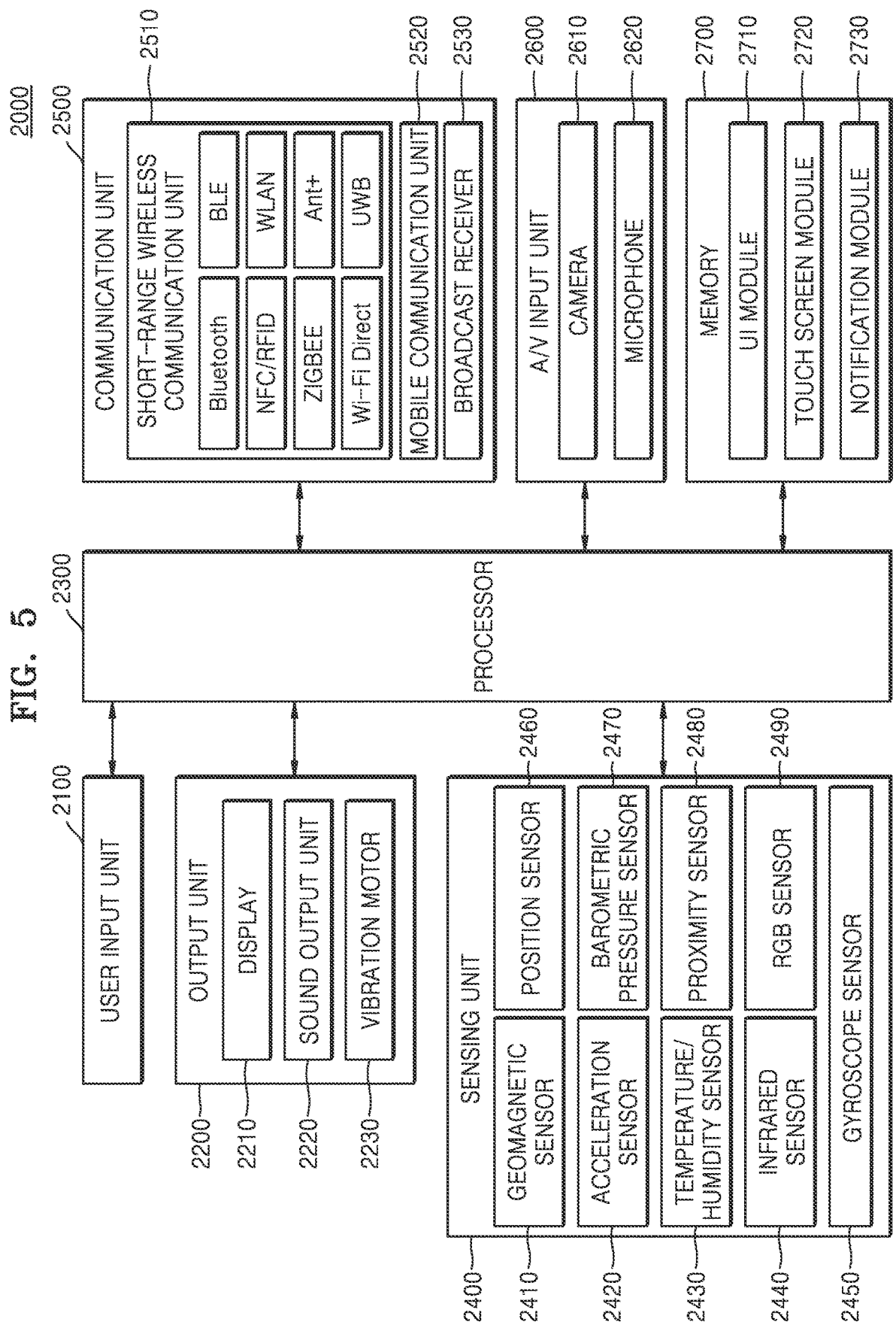
FIG. 5 is a block diagram for explaining an internal configuration of a terminal, according to an embodiment of the disclosure.

FIG. 5 is a block diagram for explaining an internal configuration of a terminal, according to an embodiment of the disclosure.

Referring to FIG. 4, a terminal 2000 may include a processor 2300, a communication unit 2500, and a memory 2700. However, not all the components illustrated in FIG. 4 are not necessary components of the terminal 2000. The terminal 2000 may be implemented by more components or less components than the components illustrated in FIG. 4.

Referring to FIG. 5, a terminal 2000 according to an embodiment of the disclosure may further include, in addition to a processor 2300, a communication unit 2500, and a memory 2700, a user input unit 2100, an output unit 2200, a sensing unit 2400, and an audio/video (A/V) input unit 2600.

The user input unit 2100 refers to a means for inputting data for a user to control the terminal 2000. For example, the user input unit 2100 may include, but is not limited to, a keypad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like.

According to an embodiment of the disclosure, the user input unit 2100 may receive a user input for performing an operation according to the first model.

The output unit 2200 may output an audio signal, a video signal, or a vibration signal, and the output unit 2200 may include a display 2210, a sound output unit 2220, and a vibration motor 2230.

The display 2210 displays and outputs information processed by the terminal 2000. According to an embodiment of the disclosure, the display 2210 may display information related to information output according to the first model.

When the display 2210 and a touch pad form a layer structure and thus constitute a touch screen, the display 2210 may also be used as an input device in addition to being used as an output device. The display 2210 may include at least one of a liquid crystal display, a thin film transistor-liquid crystal display, an organic light-emitting diode, a flexible display, a three-dimensional (3D) display, or an electrophoretic display. Also, the terminal 2000 may include two or more displays 2210 according to an implementation type of the terminal 2000.

The sound output unit 2220 outputs audio data received from the communication unit 2500 or stored in the memory 2700. According to an embodiment of the disclosure, the sound output unit 2220 may output, as an audio signal, information related to information output according to the first model.

The vibration motor 2230 may output a vibration signal. Also, when a touch is input to a touch screen, the vibration motor 2230 may output a vibration signal. According to an embodiment of the disclosure, the vibration motor 2230 may output, as a vibration signal, information related to information output according to the first model.

The processor 2300 generally controls overall operations of the terminal 2000. For example, the processor 2300 may take overall control of the user input unit 2100, the output unit 2200, the sensing unit 2400, the communication unit 2500, the A/V input unit 2600, and the like by executing programs stored in the memory 2700.

The terminal 2000 may include at least one processor 2300. For example, the terminal 2000 may include various types of processors such as a CPU, a GPU, and an NPU.

The processor 2300 may be configured to process commands of a computer program by performing basic arithmetic, logic, and input/output operations. The commands may be provided from the memory 2700 to the processor 2300 or may be received via the communication unit 2500 and provided to the processor 2300. For example, the processor 2300 may be configured to execute the commands according to program codes stored in a recording device such as memory.

The processor 2300 according to an embodiment of the disclosure may input input information to the first model according to a user input, and may perform an operation according to information output from the first model. Also, when the input information is processed by the first model, the processor 2300 may obtain intermediate data output from the first layer among layers included in the shared portion included in the first model. The first layer according to an embodiment of the disclosure may be randomly selected from among the layers included in the shared portion. When the intermediate data according to an embodiment of the disclosure is transmitted to the server 1000, information for refining the first model may be received by the terminal 2000. When the information for refining the first model, which is generated based on the intermediate data, is received from the server 1000, the processor 2300 according to an embodiment of the disclosure may refine the first model.

The sensing unit 2400 may detect a state of the terminal 2000 or a state around the terminal 2000, and may transmit detected information to the processor 2300.

The sensing unit 2400 may include, but is not limited to, at least one of a geomagnetic sensor 2410, an acceleration sensor 2420, a temperature/humidity sensor 2430, an infrared sensor 2440, a gyroscope sensor 2450, a position sensor 2460 (for example, a global positioning system (GPS)), a barometric pressure sensor 2470, a proximity sensor 2480, or an RGB sensor (illuminance sensor) 2490.

The communication unit 2500 may include one or more components allowing the terminal 2000 to communicate with the server 1000 or an external device (not shown). For example, the communication unit 2500 may include a short-range wireless communication unit 2510, a mobile communication unit 2520, and a broadcast receiver 2530.

The short-range wireless communication unit 2510 may include, but is not limited to, a Bluetooth communication unit, a Bluetooth Low Energy (BLE) communication unit, a near field communication unit, a wireless local area network (WLAN) (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 2520 transmits a radio signal to and receives a radio signal from at least one of a base station, an external terminal, or a server on a mobile communication network. Here, the radio signal may include various types of data according to transmission and reception of a voice call signal, a video call signal, or a text/multimedia message.

The broadcast receiver 2530 receives a broadcast signal and/or broadcast-related information from outside via a broadcast channel. The broadcast channel may include a satellite channel or a terrestrial channel. The terminal 2000 may not include the broadcast receiver 2530, according to an implementation example.

The communication unit 2500 according to an embodiment of the disclosure may transmit intermediate data to the server 1000, and in response thereto, may receive information for refining the first model from the server 1000. Thus, the terminal 2000 may refine the first model used in the terminal 2000, based on the information for refining the first model.

The A/V input unit 2600 is for inputting an audio signal or a video signal and may include a camera 2610, a microphone 2620, and the like. The camera 2610 may obtain an image frame of a still image, a moving image, or the like through an image sensor in a video call mode or a shooting mode. An image captured through the image sensor may be processed by the processor 2300 or a separate image processing unit (not shown).

The microphone 2620 receives an external sound signal that is input thereto and processes the sound signal into electrical sound data.

The memory 2700 may store programs for processing and control performed by the processor 2300 and may also store data that is input to or output from the terminal 2000.

The memory 2700 according to an embodiment of the disclosure may store the first model. The first model according to an embodiment of the disclosure may be generated by the server 1000, transmitted to the terminal 2000, and stored in the memory 2700. Afterwards, whenever an operation by the first model is performed, intermediate data is transmitted to the server 1000, and thus, the first model may be repeatedly refined based on information received from the server 1000.

The memory 2700 may include at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

The programs stored in the memory 2700 may be classified into a plurality of modules, for example, a UI module 2710, a touch screen module 2720, a notification module 2730, and the like, according to functions thereof.

The UI module 2710 may provide a specialized UI, a graphical user interface (GUI), or the like interworking with the terminal 2000, on an application basis. The touch screen module 2720 may sense a touch gesture of the user on a touch screen and may transfer information about the touch gesture to the processor 2300. The touch screen module 2720 according to an embodiment of the disclosure may recognize and analyze a touch code. The touch screen module 2720 may be configured by separate hardware including a controller.

To sense a touch or a proximity touch with respect to the touch screen, various sensors may be arranged inside or near the touch screen. An example of a sensor for sensing a touch with respect to the touch screen includes a tactile sensor. The tactile sensor refers to a sensor sensing a contact with a particular object to an extent felt by a human or to a higher extent. The tactile sensor may sense various pieces of information, such as roughness of a contact surface, hardness of a contact object, and a temperature of a contact point.

The touch gesture of the user may include tap, touch and hold, double tap, drag, panning, flick, drag and drop, swipe, or the like.

The notification module 2730 may generate a signal for notifying the occurrence of an event of the terminal 2000.

Figure 6:
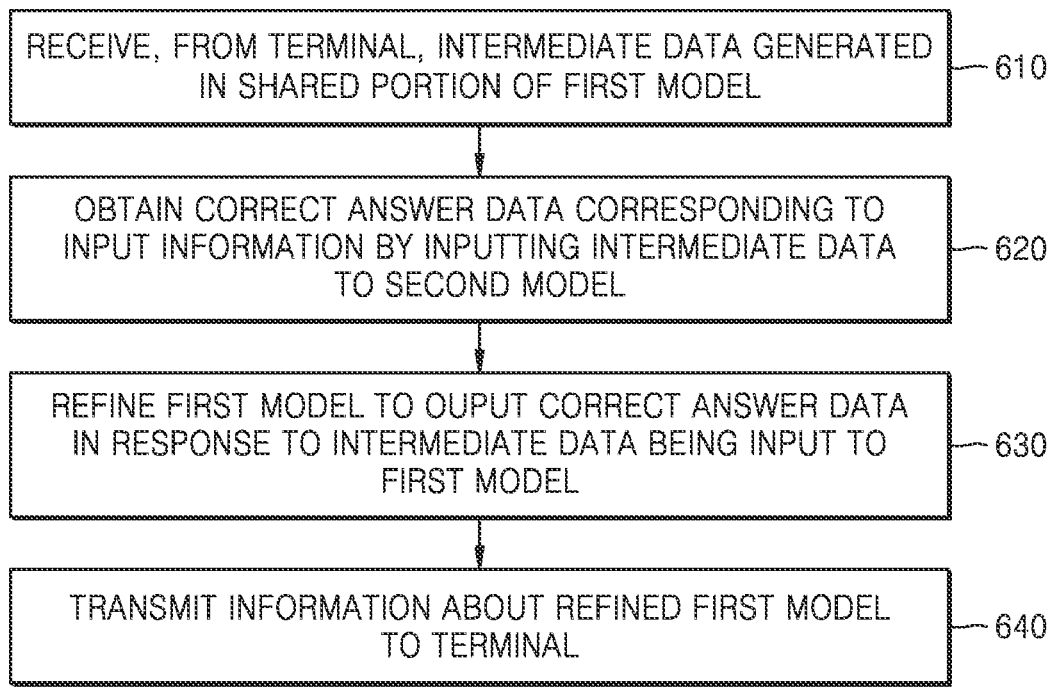
FIG. 6 is a diagram illustrating a method, performed by a server, of generating and transmitting information for refining a first model in a terminal, according to an embodiment of the disclosure.

FIG. 6 is a diagram illustrating a method, performed by a server, of generating and transmitting information for refining a first model in a terminal, according to an embodiment of the disclosure.

Referring to FIG. 6, in operation 610, a server 1000 may receive intermediate data from a terminal 2000. When receiving the intermediate data from the terminal 2000, the server 1000 according to an embodiment of the disclosure may generate information for refining the first model 220 in the terminal 2000 and transmit the information to the terminal 2000.

The intermediate data according to an embodiment of the disclosure may be generated when the first model 220 is used to perform an operation in the terminal 2000. For example, when input information is input to the first model 220 in response to a user input, values output from a layer randomly selected from among layers included in a shared portion may be obtained as the intermediate data.

In operation 620, the server 1000 may obtain correct answer data corresponding to input information by inputting the intermediate data to a second model.

The server 1000 according to an embodiment of the disclosure may identify a layer for the intermediate data, and based on the identified layer, may identify a layer, to which the intermediate data is to be input, among layers included in a shared portion of the second model. For example, when the intermediate data received from the terminal 2000 includes values output from a first layer among the layers of the shared portion, the intermediate data may be input as an output of a first layer identical to the first layer among the layers included in the shared portion of the second model.

The server 1000 according to an embodiment of the disclosure may obtain correct answer data from the second model by inputting the intermediate data as the output of the first layer included in the shared portion of the second model.

In operation 630, when the intermediate data is input to the first model, the server 1000 may refine the first model so that the correct answer data obtained in operation 620 may be output. The intermediate data according to an embodiment of the disclosure may be input to a second layer identified, in operation 620, as a layer, to which the intermediate data is to be input, in the shared portion of the first model.

In operation 640, the server 1000 may generate information for refining the first model in the terminal 2000, based on the first model refined in operation 630, and transmit the generated information to the terminal 2000.

Figure 7:
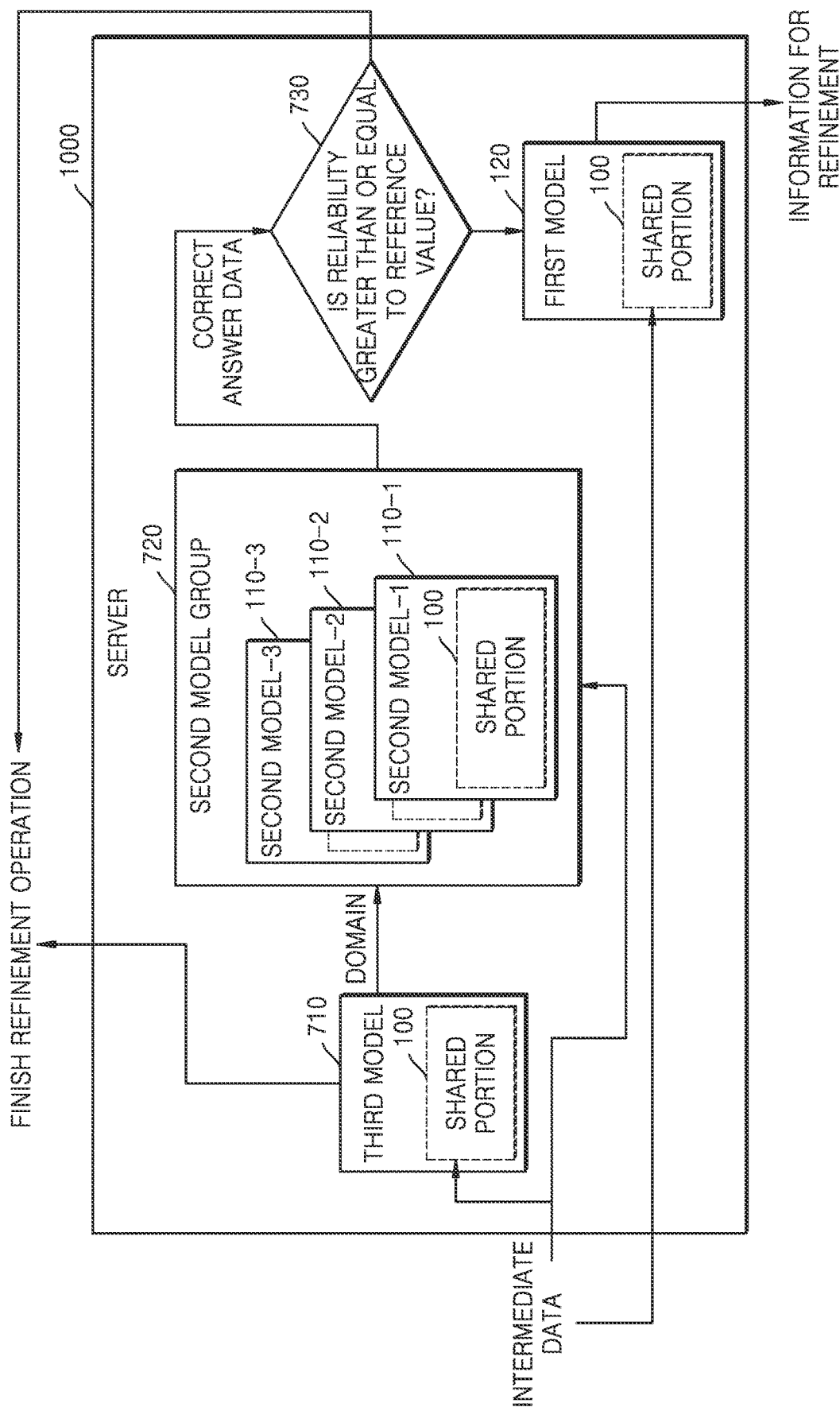
FIG. 7 is a block diagram illustrating an example of a method of generating information for refining a first model, based on a plurality of second models, according to an embodiment of the disclosure.

FIG. 7 is a block diagram illustrating an example of a method of generating information for refining a first model, based on a plurality of second models, according to an embodiment of the disclosure.

Referring to FIG. 7, a server 1000 according to an embodiment of the disclosure may refine a first model 120, based on a second model group 720 including a plurality of second models, and generate information for refining a first model 220 in a terminal 2000.

According to an embodiment of the disclosure, the plurality of second models may be generated based on training data according to each of domains. The domains according to an embodiment of the disclosure may be sorted according to characteristics of each operation performed by the terminal 2000. For example, the domains may be divided into a phone call, a gallery, an alarm, etc. for each application executed in the terminal 2000. Also, based on training data collected for each application, the plurality of second models may each be differently trained and generated.

The plurality of second models according to an embodiment of the disclosure may be trained based on training data specified according to each domain. Thus, more accurate correct answer data may be obtained based on the plurality of second models being used than one second model being used.

The plurality of second models according to an embodiment of the disclosure may also be trained and generated to equally include the shared portion 100 set in the first model 120.

When receiving intermediate data from the terminal 2000, the server 1000 according to an embodiment of the disclosure may select a domain for identifying a second model for refining the first model 120 among the plurality of second models included in the second model group 720.

A domain for a second model according to an embodiment of the disclosure may be selected based on a third model 710 pretrained to select a domain based on intermediate data. For example, the third model 710 may be a domain classifier (DC) model. The disclosure is not limited thereto, and the server 1000 may select a domain of a second model, based on various types of AI models.

The third model 710 according to an embodiment of the disclosure may equally include the shared portion 100 set in the first model 120 in the same manner as the second model. Although the third model 710 according to an embodiment of the disclosure may be trained based on training data for selecting a domain of a second model, the shared portion 100 of the third model 710 may be trained while being included in the third model 710 as it is without modification.

The training data used for training the third model 710 according to an embodiment of the disclosure may include data different from training data used for training a second model. The disclosure is not limited thereto, and the training data for training the third model 710 may include various types of data.

The third model 710 according to an embodiment of the disclosure may receive an input of intermediate data as an output of a first layer in the shared portion 100 of the third model 710 in the same manner as in a case where intermediate data is input to the second model. According to an embodiment of the disclosure, when the intermediate data is input as the output of the first layer to the shared portion 100 of the third model 710, information about a domain of a second model may be output.

According to an embodiment of the disclosure, based on the information about the domain of the second model output from the third model 710, at least one second model may be selected from among a plurality of second models 110-1, 110-2, and 110-3 included in the second model group 720. Also, when intermediate data is input to the selected at least one second model, correct answer data for refining the first model 120 may be obtained.

According to an embodiment of the disclosure, based on the information about the domain, the plurality of second models 110-1, 110-2, and 110-3 may be selected. In this case, a plurality of pieces of correct answer data may be obtained by the plurality of second models 110-1, 110-2, and 110-3. According to an embodiment of the disclosure, a representative value (e.g., an average value, a median value, a maximum value, etc.) for the plurality of pieces of correct answer data may be used as correct answer data for refining the first model 120. The disclosure is not limited thereto, and a value obtained according to various methods based on the plurality of pieces of correct answer data may be used as correct answer data for refining the first model 120.

In contrast, when information about the domain output from the third model 710 according to an embodiment of the disclosure relates to a domain that is not suitable for refining the first model 120, a refinement operation according to an embodiment of the disclosure may not be performed. For example, when the domain selected by the third model 710 is a domain that is preset as a domain that is not used to refine the first model 120, a refinement operation for the first model 120 may not be performed on the currently received intermediate data.

In 730, the server 1000 according to an embodiment of the disclosure may determine whether a reliability of the correct answer data obtained from the second model group 720 is greater than or equal to a reference value. The correct answer data according to an embodiment of the disclosure may further include information indicating reliability (e.g., probability information on an output value).

When the reliability of the correct answer data according to an embodiment of the disclosure is greater than or equal to the reference value, an operation for refining the first model 120 may be performed based on the correct answer data. In contrast, when the reliability is less than or equal to the reference value, an operation for refining the first model 120 may not be performed on the currently received intermediate data.

Thus, according to an embodiment of the disclosure, based on reliability of correct answer data, refinement of the first model 120 may be selectively performed.

Figure 8:
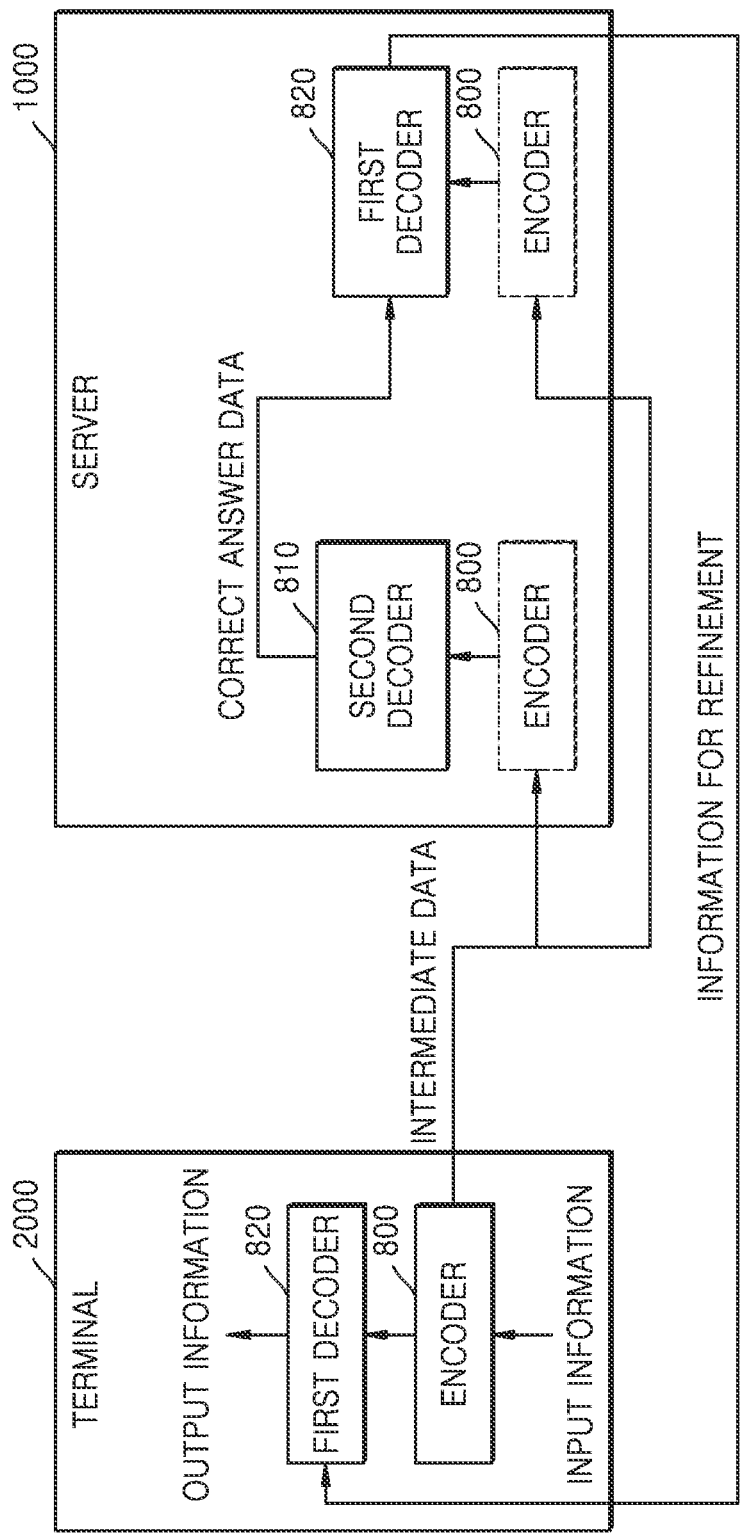
FIG. 8 is a block diagram illustrating an example of refining a decoder included in a terminal, according to an embodiment of the disclosure.

FIG. 8 is a block diagram illustrating an example of refining a decoder included in a terminal, according to an embodiment of the disclosure.

Referring to FIG. 8, a terminal 2000 may perform various operations, based on an encoder 800 and a first decoder 820. For example, the terminal 2000 may translate text in a first language into a second language and output the text in the second language by using the encoder 800 and the first decoder 820.

The encoder 800 according to an embodiment of the disclosure may convert the text in the first language into context information in the form of a vector, and the first decoder 820 may output, based on the context information, the text in the second language.

According to an embodiment of the disclosure, the encoder 800 may correspond to the shared portion 100. Also, the first decoder 820 may correspond to the first model 220 except for the shared portion 100. Also, a second decoder 810 may correspond to the second model 110 except for the shared portion 100 according to an embodiment of the disclosure.

The first decoder 820 and the second decoder 810 according to an embodiment of the disclosure may perform an operation, based on information output from the identical encoder 800.

According to an embodiment of the disclosure, based on a translation operation, by the encoder 800 and the first decoder 820, the input text in the first language may be translated and output into the text in the second language. In this case, information output from a first layer among at least one layer of an AI model included in the encoder 800 is intermediate data, and may be transmitted to the server 1000.

Also, the server 1000 according to an embodiment of the disclosure may input the intermediate data to the encoder 800 for the second decoder 810. The encoder 800 to which the intermediate data is input may be an encoder for outputting context information to the second decoder 810 having better performance than that of the first decoder 820. Also, the intermediate data may be input as the output of the first layer among the at least one layer of the AI model included in the encoder 800. When the intermediate data is input to the encoder 800, the text in the second language output from the second decoder 810 may be obtained as correct answer data.

According to an embodiment of the disclosure, because the encoder 800 for the second decoder 810 is identical to the encoder 800 for the first decoder 820, the context information, which is received from the encoder 800, in the first decoder 820 may be identical to the context information obtained based on the intermediate data, which is received from the encoder 800, in the second decoder 810. Thus, according to an embodiment of the disclosure, the second decoder 810 may receive an input identical to an input of the first decoder 820 (i.e., context information), and thus may output correct answer data for the input of the first decoder 820.

The first decoder 820 of the server 1000 according to an embodiment of the disclosure may be refined so that the correct answer data may be output based on the intermediate data. According to an embodiment, when the intermediate data is input to the encoder 800 of the first decoder 820, the first decoder 820 may be refined so that the correct answer data may be output. The encoder 800 to which the intermediate data is input may be an encoder for outputting context information to the first decoder 820.

The server 1000 according to an embodiment of the disclosure may generate information for refining the first decoder 820 in the terminal 2000, based on the refined first decoder 820, and transmit the information to the terminal 2000.

According to an embodiment of the disclosure, instead of input information, intermediate data generated in an AI model is transmitted to a server, and thus, a possibility of personal information being leaked in response to the input information being transmitted may be reduced.

A machine-readable storage medium may be provided in the form of a non-transitory storage medium. Here, the term "non-transitory storage medium" only means that it is a tangible device and does not include signals (e.g., electromagnetic waves), and the term does not distinguish between a case where data is stored semi-permanently in a storage medium and a case where data is temporarily stored. For example, the "non-transitory storage medium" may include a buffer in which data is temporarily stored.

According to an embodiment of the disclosure, methods according to various embodiments disclosed herein may be provided while included in a computer program product. The computer program product may be traded as merchandise between a seller and a purchaser. The computer program product may be distributed in the form of a machine-readable storage medium (e.g., a compact disc read only memory (CD-ROM)), or may be distributed (e.g., downloaded or uploaded) online via an application store (e.g., Play Store™) or between two user devices (e.g., smartphones) directly. When distributed online, at least part of the computer program product (e.g., a downloadable application) may be temporarily generated or at least temporarily stored in a machine-readable storage medium, such as a memory of a manufacturer's server, a server of an application store, or a relay server.

In addition, the term such as " . . . unit" or " . . . portion" used herein may refer to a hardware component such as a processor or a circuit, and/or a software component executed by the hardware component such as a processor.

It will be understood by one of ordinary skill in the art that the embodiments of the disclosure are provided for illustration and may be implemented in different ways without departing from the spirit and scope of the disclosure. Therefore, it should be understood that the foregoing embodiments of the disclosure are provided for illustrative purposes only and are not to be construed in any way as limiting the disclosure. For example, each component described as a single type may be implemented in a distributed manner, and likewise, components described as being distributed may be implemented as a combined type.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by a server, of generating information for updating a model in a terminal, the method comprising:

in response to input information being received by a first terminal-side model in the terminal, receiving, from the terminal, intermediate data output from a first layer included in a shared portion of the first terminal-side model and identification information of the first layer, wherein the shared portion includes a plurality of layers from an input layer within the first terminal-side model;

obtaining a first server-side model and a second model which correspond to the first terminal-side model, wherein the first server-side model is the same artificial intelligence model as the first terminal-side model, the second model includes the shared portion which includes an input layer of the second model, the second model has more layers than the first server-side model, and the second model and the first server-side model are pre-trained using the same training data;

based on the intermediate data and the identification information of the first layer, obtaining output data of the second model as correct answer data for the input information by inputting the intermediate data received from the terminal as an input to a layer following the first layer included in the shared portion of the second model;

based on the intermediate data and the identification information of the first layer, updating the first server-side model by updating a plurality of weight values and bias values of the first server-side model so that the correct answer data is output from the first server-side model when the intermediate data received from the terminal is input to a layer following the first layer included in the shared portion of the first server-side model; and transmitting difference information between the updated first server-side model and the first server-side model prior to the update to the terminal so that the first terminal-side model outputs the correct answer data when the input information is input to the first terminal-side model by updating the first terminal-side model based on the difference information.

2. The method of claim 1, wherein the first layer is randomly determined from among at least one layer included in the shared portion.

3. The method of claim 1,
wherein the shared portion is set among at least one layer including an input layer, the at least one layer constituting the first terminal-side model, and
wherein the second model is a model trained by including the shared portion.

4. The method of claim 1, wherein the shared portion is set based on at least one of performance of the second model or a security level in response to the intermediate data being transmitted.

5. The method of claim 1, wherein the first server-side model is updated based on reliability of the correct answer data.

6. The method of claim 1, wherein the obtaining of the first server-side model and the second model comprises:
selecting a domain of the second model by inputting the intermediate data as an output of the first layer to the first layer included in the shared portion of a third model for selecting the domain of the second model; and
based on the selected domain, obtaining at least one second model from among a plurality of second models.

7. A method, performed by a terminal, of updating a model, the method comprising:

in response to input information being received by a first terminal-side model in the terminal, obtaining intermediate data output from a first layer included in a shared portion of the first terminal-side model, wherein the shared portion includes a plurality of layers from an input layer within the first terminal-side model;

transmitting the intermediate data and identification information of the first layer to a server;

receiving, from the server, difference information for updating the first terminal-side model; and updating the first terminal-side model based on the difference information, wherein the server includes a first server-side model and a second model which correspond to the first terminal-side model, the first server-side model is the same artificial intelligence model as the first terminal-side model, the second model includes the shared portion of the first which includes an input layer of the second model, the second model has more layers than the first server-side model, and the second model and the first server-side model are pre-trained using the same training data, wherein, based on the intermediate data and the identification information of the first layer, an output data of the second model is obtained as correct answer data for the input information when the intermediate data is input to a layer following the first layer included in the shared portion of the second model, wherein, based on the intermediate data and the identification information of the first layer, the first server-side model is updated so that correct answer data is output from the first server-side model when the intermediate data is input to a layer following the first layer included in the shared portion of the first server-side model, wherein the difference information includes difference between the updated first server-side model and the first server-side model prior to the update, wherein the updating of the first terminal-side model based on the difference information comprises:

updating the first terminal-side model so that the first terminal-side model outputs the correct answer data when the input information is input to the first terminal-side model.

8. A server for generating information for updating a first model in a terminal, the server comprising:

a communication circuitry configured to receive, from the terminal, in response to input information being received by a first terminal-side model in the terminal, intermediate data output from a first layer included in a shared portion of the first terminal-side model and identification information of the first layer, wherein the shared portion includes a plurality of layers from an input layer within the first terminal-side model;

a memory storing a first server-side model and a second model which correspond to the first terminal-side model, wherein the first server-side model is the same artificial intelligence model as the first terminal-side model, the second model includes the shared portion which includes an input layer of the second model, the second model has more layers than the first server-side model, and the second model and the first server-side model are pre-trained using the same training data; and at least one processor configured to:
- based on the intermediate data and the identification information of the first layer, obtain an output data of the second model as correct answer data for the input information by inputting the intermediate data received from the terminal as an input to a layer following the first layer included in the shared portion of the second model,
- based on the intermediate data and the identification information of the first layer, update the first server-side model by updating a plurality of weight values and bias values of the first server-side model so that the correct answer data is output from the first server-side model when the intermediate data received from the terminal is input to a layer following the first layer included in the shared portion of the first server-side model, and
- control the communication circuitry to transmit difference information between the updated first server-side model and the first server-side model prior to the update to the terminal so that the first terminal-side model outputs the correct answer data when the input information is input to the first terminal-side model by updating the first terminal-side model based on the difference information.

9. The server of claim 8, wherein the first layer is randomly determined from among at least one layer included in the shared portion.

10. The server of claim 8,
wherein the shared portion is set among at least one layer including an input layer, the at least one layer constituting the first terminal-side model, and
wherein the second model is a model trained by including the shared portion.

11. The server of claim 8, wherein the shared portion is set based on at least one of performance of the second model or a security level in response to the intermediate data being transmitted.

12. The server of claim 8, wherein the first server-side model is updated based on reliability of the correct answer data.

13. The server of claim 8, wherein the at least one processor is further configured to:
- select a domain of the second model by inputting the intermediate data as an output of the first layer to the first layer included in the shared portion of a third model for selecting the domain of the second model, and
- based on the selected domain, obtain at least one second model from among a plurality of second models.

14. A terminal for updating a model, the terminal comprising:
- a memory storing a first terminal-side model;
- in response to input information being received by the first terminal-side model in the terminal, at least one processor configured to obtain intermediate data output from a first layer included in a shared portion of the first terminal-side model, wherein the shared portion includes a plurality of layers from an input layer within the first terminal-side model; and
- a communication circuitry configured to, in response to the intermediate data and identification information of the first layer being transmitted to a server, receive, from the server, difference information for updating the first terminal-side model, wherein the at least one processor further configured to update the first terminal- side model based on the difference information, wherein the server includes a first server-side model and a second model which correspond to the first terminal-side model, the first server-side model is the same artificial intelligence model as the first terminal-side model, the second model includes the shared portion which includes an input layer of the second model, the second model has more layers than the first server-side model, and the second model and the first server-side model are pre-trained using the same training data, wherein, based on the intermediate data and the identification information of the first layer, an output data of the second model is obtained as correct answer data for the input information when the intermediate data is input to a layer following the first layer included in the shared portion of the second model, wherein, based on the intermediate data and the identification information of the first layer, the first server-side model is updated so that correct answer data is output from the first server-side model when the intermediate data is input to a layer following the first layer included in the shared portion of the first server-side model, wherein the difference information includes difference between the updated first server-side model and the first server-side model prior to the update, wherein the updating of the first terminal-side model based on the difference information comprises:
updating the first terminal-side model so that the first terminal-side model outputs the correct answer data when the input information is input to the first terminal-side model.

15. A non-transitory computer-readable recording medium having recorded thereon a program for implementing the method of claim 1.

* * * * *